United States Patent
Kitayama et al.

(10) Patent No.: US 9,663,175 B2
(45) Date of Patent: May 30, 2017

(54) FRONT FENDER STRUCTURE FOR SADDLE-RIDE TYPE VEHICLE

(71) Applicant: HONDA MOTOR CO., LTD., Tokyo (JP)

(72) Inventors: Kyosuke Kitayama, Wako (JP); Hirotsugu Ueno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/826,548

(22) Filed: Aug. 14, 2015

(65) Prior Publication Data

US 2016/0059921 A1   Mar. 3, 2016

(30) Foreign Application Priority Data

Sep. 1, 2014   (JP) .................................. 2014-177039

(51) Int. Cl.
*B62J 15/00* (2006.01)

(52) U.S. Cl.
CPC ..................... *B62J 15/00* (2013.01)

(58) Field of Classification Search
CPC ........................................................ B62J 15/00
USPC .............................................. 280/160.1, 852
See application file for complete search history.

(56) References Cited

U.S. PATENT DOCUMENTS

| | | | | |
|---|---|---|---|---|
| 5,275,427 A * | 1/1994 | Gasser | ..................... | B62J 15/00 280/152.3 |
| 6,331,011 B1 * | 12/2001 | Feldmann | ................ | B62J 15/00 280/152.1 |
| 6,435,533 B1 * | 8/2002 | Chuang | .................... | B62J 15/00 280/152.1 |
| 6,634,664 B1 * | 10/2003 | Kojima | .................... | B62J 15/02 224/423 |
| 7,325,639 B2 * | 2/2008 | Yamaguchi | .............. | B62J 15/00 180/219 |
| 7,681,942 B2 * | 3/2010 | | | Van Der Westhuizen ............ B62J 17/02 244/103 R |
| 8,016,307 B2 * | 9/2011 | Adachi | .................... | B62J 15/02 280/152.1 |
| 8,562,010 B2 * | 10/2013 | Namiki | .................... | B62J 27/00 280/160.1 |
| 8,864,002 B2 * | 10/2014 | Iida | ........................... | B62J 7/04 224/413 |

FOREIGN PATENT DOCUMENTS

| | | |
|---|---|---|
| JP | 2006-015930 | 1/2006 |
| JP | 2013-216234 | 10/2013 |

\* cited by examiner

*Primary Examiner* — Kevin Hurley
*Assistant Examiner* — Marlon A Arce
(74) *Attorney, Agent, or Firm* — Rankin, Hill & Clark LLP

(57) ABSTRACT

A front fender structure for a saddle-ride type vehicle, capable of preventing water, mud or the like from adhering to an engine, a radiator or the like while efficiently cooling the engine, the radiator or the like by using traveling air. A front fender is supported by a front fork in such a manner that a front end of a backward fender is positioned higher than a front end of a forward fender in a side view, and is formed with ventilating holes 88 allowing traveling air to pass through and provided behind the forward fender and above the backward fender.

20 Claims, 8 Drawing Sheets

FRONT FENDER STRUCTURE FOR SADDLE-RIDE TYPE VEHICLE

BACKGROUND OF THE INVENTION

Field of the Invention

The present invention relates to a front fender structure for a saddle-ride type vehicle with a front fender divided into two, namely, a forward fender and a backward fender.

Description of Related Art

The existing fender structure for a saddle-ride type vehicle with a front fender divided into two, namely, an upper fender and a lower fender, has been well known (for example, see JP Patent No. 4476720 and JP-A No. 2013-216234).

For the front fender, such a structure is employed that traveling air is introduced to a side of an engine while suppressing scatter of splashed water, mud or the like to the side of the engine.

In the structure employed in JP Patent No. 4476720 and JP-A No. 2013-216234, the engine is directly exposed to the traveling air since the upper fender and the lower fender are largely separated from each other in a vertical direction. Thereby, an engine of one's own vehicle gets splashed with the water, mud or the like splashed from a vehicle traveling in front of one's own vehicle. Also, since the water, mud or the like splashed from a front wheel of one's own vehicle is introduced to a side of the engine by the traveling air flowing between the upper fender and the lower fender, the engine and the periphery thereof get dirty.

SUMMARY OF THE INVENTION

The present invention has been achieved in view of the above-mentioned circumstances, and an object of the present invention is to provide a front fender structure for a saddle-ride type vehicle capable of preventing adhesion of water, mud or the like to an engine, a radiator or the like while efficiently cooling the engine, the radiator or the like by using the traveling air.

In accordance with the present invention, a front fender structure for a saddle-ride type vehicle in which a front fork is steerably supported at a front end of a vehicle body frame, a front wheel is supported at a lower end of the front fork, the front wheel is covered with a front fender from above, an engine is arranged behind the front fender, and the front fender is composed of a forward fender and a backward fender having a portion overlapping with the forward fender in a plan view. In the front fender structure for the saddle-ride type vehicle, the front fender is supported by the front fork in such a manner that a front end of the backward fender is positioned higher than a front end of the forward fender in a side view, and is formed with a ventilating hole allowing traveling air to pass through and provided behind the forward fender and above the backward fender.

In the above-mentioned structure, the ventilating hole may be formed of a rear wall provided at a rear edge of the forward fender in order to extend downward and an upper surface of the backward fender, and the front end of the backward fender (32) may be arranged forward of the rear wall.

Also, in the above-mentioned structure, the rear wall of the forward fender may be provided with a fastening part to which the backward fender is fastened.

Also, in the above-mentioned structure, a straightening vane extending in a vehicle longitudinal direction may be provided between the forward fender and the backward fender.

Also, in the above-mentioned structure, the straightening vane may extend from either the forward fender or the backward fender and may abut on the other.

Also, in the above-mentioned structure, the forward fender and the backward fender may be respectively provided with a pair of left and right fastening arms fastened to a lower part of the front fork, the fastening arms of the forward fender may be fastened to a front side of a lower part of the front fork, and the fastening arms of the backward fender may be fastened to a rear side of the lower part of the front fork.

Also, in the above-mentioned structure, the backward fender may be provided with front fork relief parts for avoiding interference with the front fork on either side surface of the backward fender.

Also, in the above-mentioned structure, an upper end of the front fork may be covered with a front cowl, and the front cowl may be formed with a groove part for avoiding interference with the forward fender when the front fork is most contracted.

Also, in the above-mentioned structure, a radiator may be arranged behind the front fender and the front fork, and the radiator may overlap with the front fender when viewed from a front side.

With the present invention, the front end of the backward fender is positioned higher than the front end of the forward fender in the side view, and is provided with the ventilating hole allowing traveling air to pass through and provided behind the forward fender and above the backward fender. For this reason, the traveling air passing between the forward fender and the backward fender can be led to flow to the engine through the ventilating hole, the engine and the periphery thereof can be effectively cooled, and also air resistance of the traveling air in the front fender can be reduced.

Further, the front end of the backward fender is positioned higher than the front end of the forward fender in the side view. For this reason, when water, mud or the like splashed from a road surface is scattered from a front side to a rear side of the front fender, scatter of the splashed water, mud or the like to the ventilating hole can be suppressed and can be prevented from reaching the engine.

In this way, the engine and the periphery thereof can be effectively cooled while suppressing the scatter of the splashed water, mud or the like to the engine.

Also, the ventilating hole is formed of the rear wall provided at the rear edge of the forward fender in order to extend downward and the upper surface of the backward fender, and the front end of the backward fender is arranged forward of the rear wall. With this arrangement, the rear wall is provided integrally at the rear edge of the forward fender. For this reason, rigidity of the forward fender can be improved, and deformation of the forward fender can be suppressed even if the ventilating hole is formed in the rear wall. Also, the water, mud or the like scattered from the front can be caught by the rear wall, and the scatter of the water, mud or the like to the side of the engine can be further suppressed. Further, since the rear wall is provided, the inside of the forward fender can become less visible from the obliquely rear side of the vehicle, and appearance quality can be improved.

Also, since the rear wall of the forward fender is provided with the fastening part to which the backward fender is fastened, the backward fender can be firmly fastened to the forward fender. Herewith, vibration and mutual displacement of the forward fender and the backward fender can be prevented.

Also, since the straightening vane extending in the vehicle longitudinal direction is provided between the forward fender and the backward fender, the traveling air can be straightened by the straightening vane and can be efficiently led to flow to the rear. Also, since the straightening vane is provided, rigidity can be improved, and vibration can be prevented.

Also, the straightening vane extends from either the forward fender or the backward fender and abuts on the other. For this reason, the mutual vibration can be prevented by allowing the straightening vane provided to either the forward fender or the backward fender to abut on the other.

Also, the forward fender and the backward fender are respectively provided with a pair of left and right fastening arms fastened to the lower part of the front fork, the fastening arms of the forward fender are fastened to the front side of the lower part of the front fork, and the fastening arms of the backward fender are fastened to the rear side of the lower part of the front fork. For this reason, overhang of the fastening arms to the outside in a vehicle width direction can be suppressed by distributedly fastening the respective fastening arms of the forward fender and the backward fender to the front side and the rear side of the lower part of the front fork.

Also, the backward fender is provided with the front fork relief parts for avoiding interference with the front fork on either side surface of the backward fender. For this reason, a horizontal width of the front fork is narrowed and the traveling air can be efficiently introduced from the ventilating hole to the engine.

Also, the upper end of the front fork is covered with the front cowl, and the front cowl is formed with the groove part for avoiding interference with the front fender when the front fork is most contracted. For this reason, a cross-sectional surface of a traveling air passage between the forward fender and the backward fender can be enlarged by upwardly swelling the upper part of the forward fender, and a cooling effect on the engine can be further improved by increasing air volume of the traveling air.

Also, the radiator is arranged behind the front fender and the front fork, and the radiator overlaps with the front fender when viewed from the front side. For this reason, the radiator can be efficiently cooled by exposing the radiator to the traveling air from the ventilating hole while suppressing splash of the water and mud from the front.

BRIEF DESCRIPTION OF THE DRAWINGS

These and further features of the invention will be apparent with reference to the following description and drawings, wherein.

DETAILED DESCRIPTION OF THE INVENTION

Figure 1:
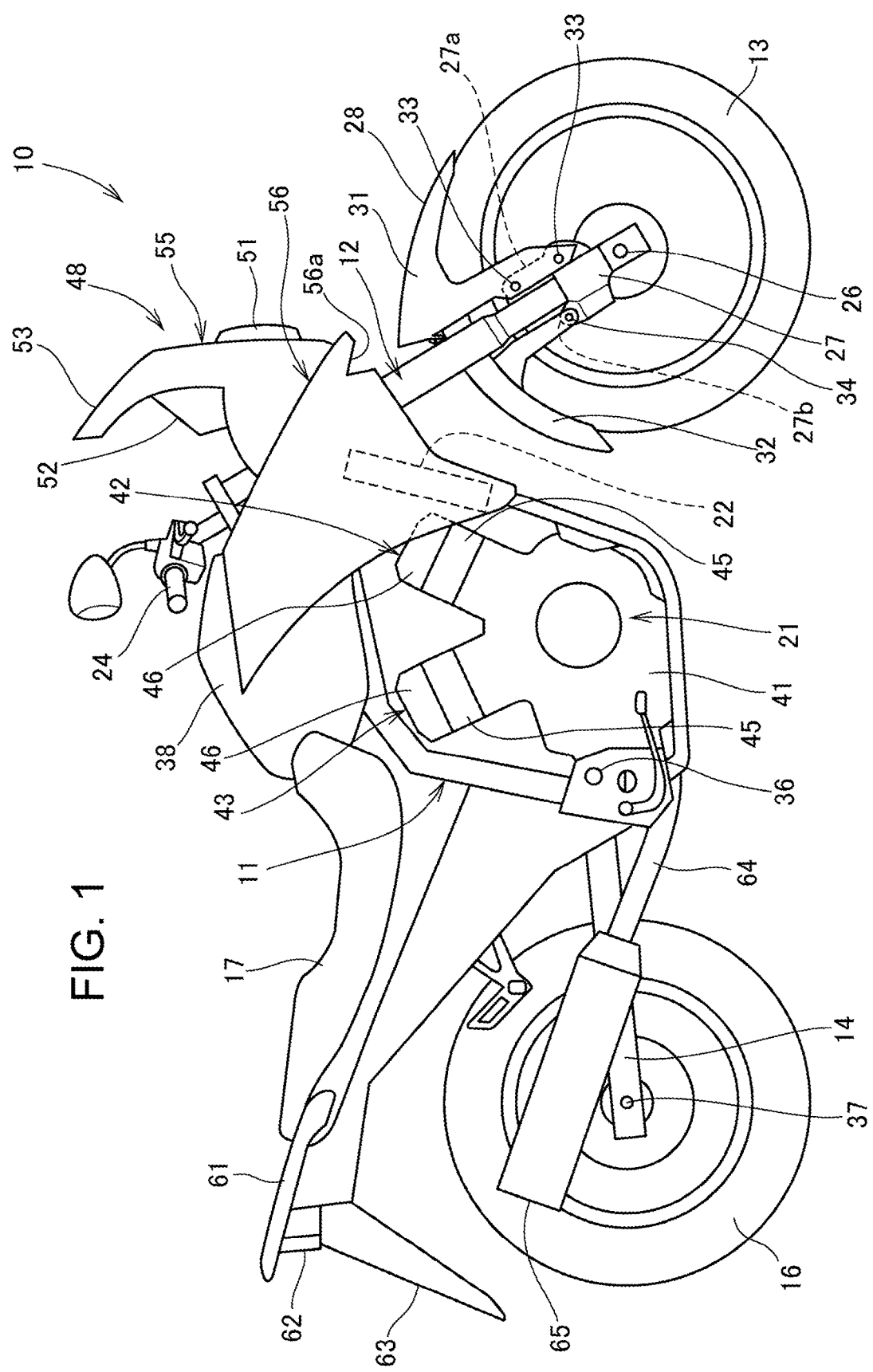
FIG. 1 is a right side view of a motorcycle including a front fender structure according to an embodiment of the present invention.

An embodiment of the present invention will be described below with reference to drawings. Note that in the explanation, description of directions such as front and rear, right and left, and upper and lower, is the same as directions with respect to a vehicle body unless otherwise especially described. Also, note that in the drawings, a reference sign FR is indicative of a front side of the vehicle body, a reference sign UP is indicative of an upper side of the vehicle body, and a reference sign LH is indicative of a left side of the vehicle body.

FIG. 1 is a right side view of a motorcycle 10 including a front fender structure according to an embodiment of the present invention.

The motorcycle 10 is a saddle-ride type vehicle configured such that a front wheel 13 is supported at a front end of a vehicle body frame 11 through a front fork 12, a rear wheel 16 is supported by a lower part of the vehicle body frame 11 through a swing arm 14, and a seat 17 is supported by a rear part of the vehicle body frame 11.

A V-type engine 21 is supported by a lower part of a front part of the vehicle body frame 11, and a radiator 22 is attached to the vehicle body frame 11 in front of the engine 21.

A front fork 12 is steerably supported by a head pipe (not shown) composing the vehicle body frame 11, a handlebar 24 is supported in an upper part of the front fork 12, and a front wheel 13 is supported in a lower part of the front fork 12 through an axle 26. Also, a front fender 28 for covering the front wheel 13 from above is attached to a lower part of a fork pipe 27 formed of a pair of right and left shock absorbers composing the front fork 12.

The front fender 28 is composed of a forward fender 31 arranged in front of the front fork 12, and a backward fender 32 with most thereof arranged behind the forward fender 31. Right and left lower parts of the forward fender 31 are attached to a front support part 27a by a plurality of bolts 33, the front support part being provided to the front part of the lower part of the fork pipe 27. The backward fender 32 is attached to a rear support part 27b by a bolt 34, the rear support part being provided to the rear part of the lower part of the fork pipe 27.

The swing arm 14 is vertically swingably supported on the vehicle body frame 11 through a pivot shaft 36, and the rear wheel 16 is supported at a rear end of the swing arm 14 through an axle 37.

A fuel tank 38 supported on the front part of the vehicle body frame 11 is arranged in front of the seat 17.

The engine 21 is provided with a crankcase 41, and a front cylinder 42 and a rear cylinder 43 respectively obliquely upwardly raised from a front part and a rear part of the crankcase 41. The front cylinder 42 and the rear cylinder 43 are respectively provided with cylinder heads 45 and head covers 46.

The radiator 22 is connected to a cooling water passage of the engine 21 through a radiator hose (not shown), so that cooling water is circulated through the engine 21 and the radiator 22. Thereby, the radiator 22 dissipates heat from the cooling water heated by the engine 21.

Both sides of the front fork 12, the radiator 22 and the fuel tank 38 are covered with a front cowl 48.

The front cowl 48 is composed of a front upper cowl 55 attached with a headlight 51, a meter 52 and a windshield 53, and a pair of front lower cowls 56 arranged on right and left sides of a rear part of the front upper cowl 55. The radiator 22 is covered with the front lower cowls 56 from both sides.

Lower parts of front parts of the front lower cowls 56 are formed with relief parts 56a for avoiding interference with the forward fender 31. That is, when a stroke made to a state where the right and left fork pipes 27 of the front fork 12 are most contracted or a state close to a state where the right and left fork pipes 27 of the front fork 12 are most contracted and the front fender 28 is moved toward the front lower cowls 56, the forward fender 31 is prevented from interfering with the front lower cowls 56 by the relief parts 56a. Note that in the drawing, a reference sign 61 is indicative of a grab rail, a reference sign 62 is indicative of a taillight, a reference sign 63 is indicative of a rear fender for covering the rear wheel 16 from above, a reference sign 64 is indicative of an exhaust pipe connected to the front and rear cylinder heads 45, and a reference sign 65 is indicative of a muffler connected to the exhaust pipe 64.

Figure 2:
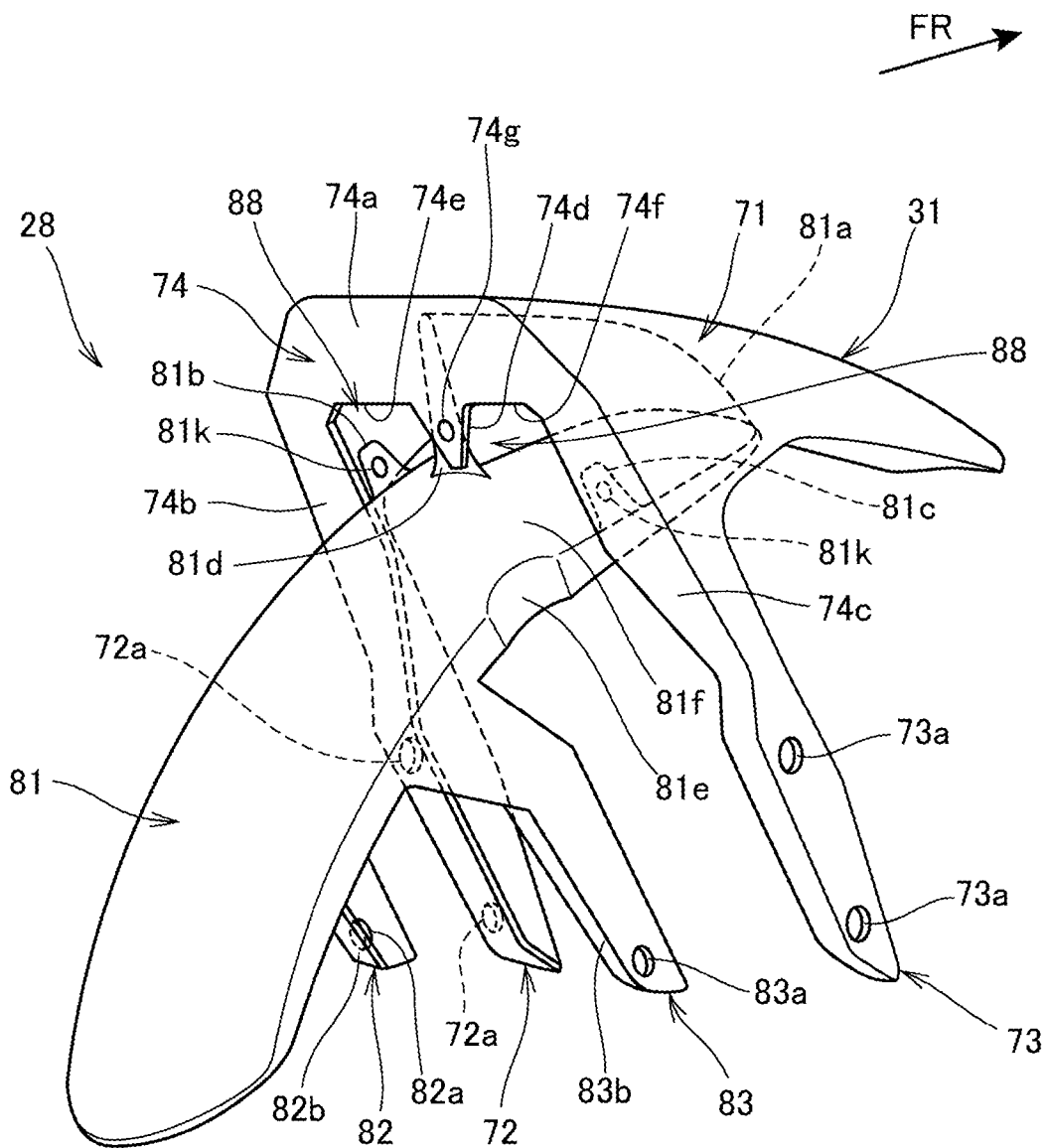
FIG. 2 is a perspective view showing a front fender.
Figure 3:
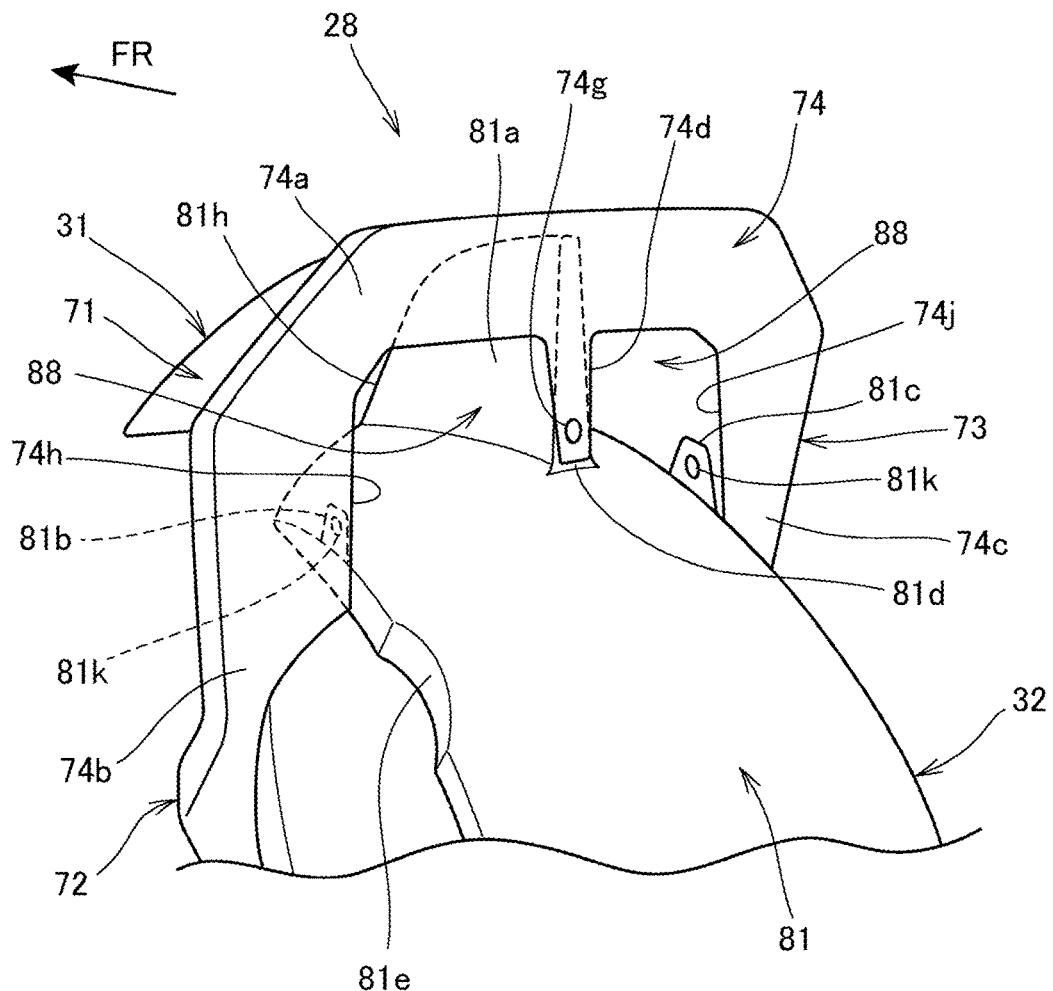
FIG. 3 is a perspective view explaining a straightening vane of a backward fender.

FIG. 2 is a perspective view showing the front fender 28, and FIG. 3 is a perspective view explaining a straightening vane 81a of the backward fender 32.

As shown in FIG. 2, in the forward fender 31, a fender body 71 for covering the front wheel 13 (see FIG. 1) from above and a pair of right and left fastening arms 73, 72 extending downward and obliquely forward from the rear of the fender body 71 are formed integrally with each other.

The fender body 71 and rear edges of the fastening arms 72, 73 are integrally provided with the rear wall 74.

The fastening arms 72, 73 are portions attached to the lower part of the front fork 12 (see FIG. 1), and are provided with a plurality of bolt insertion holes 72a, 73a formed in side surfaces in order to insert the bolts 33 (see FIG. 1) used for attachment. The rear wall 74 is a portion functioning as a rib to improve rigidity of the fender body 71 and the fastening arms 72, 73, and is composed of a rear wall upper part 74a provided in the upper part, and rear wall side parts 74b, 74c extending downward along the fastening arms 72, 73 from right and left ends of the rear wall upper part 74a. The rear wall upper part 74a is provided with a lower extension piece 74d extending downward from the center of the rear wall upper part, and notches 74e, 74f formed in both sides of the lower extension piece 74d.

In the lower extension piece 74d, a screw insertion hole 74g is opened in order to insert a screw for fastening to the backward fender 32.

The backward fender 32 is integrally formed with a fender body 81 obliquely covering the front wheel 13 from above and from behind, and a pair of right and left fastening arms 83, 82 extending downward and obliquely forward from a longitudinally intermediate part of the fender body 81.

The fender body 81 is integrally formed with the straightening vane 81a projecting upward from an upper surface 81f of a front part and extending in a longitudinal direction, and upwardly projecting pieces 81b, 81c upwardly projecting from right and left edges. Screw insertion holes 81k are respectively opened in the upwardly projecting pieces 81b, 81c, and the upwardly projecting pieces 81b, 81c are fastened to inner sides of the fastening arms 72, 73 of the forward fender 31 by screws inserted into the screw insertion holes 81k.

As shown in FIG. 3, the straightening vane 81a straightens the traveling air passing between portions with the forward fender 31 and the backward fender 32 overlapping with each other in the vertical direction, thereby allowing the traveling air to smoothly flow. A rear end surface 81d of the straightening vane 81a is fastened to the lower extension piece 74d of the forward fender 31 by the screw. A rear part of a ridge line 81h as an upper edge of the straightening vane 81a abuts on a lower surface 71b (see FIG. 7) of the forward fender 31. In this way, the ridge line 81h of the straightening vane 81a abuts on the forward fender 31. For this reason, the rigidity of each of the forward fender 31 and the backward fender 32 can be improved, and the vibration can be prevented.

For example, the above-mentioned straightening vane may be formed such that the straightening vane 81a integrally projects downward from the fender body 71 of the forward fender 31, and the ridge line as a lower edge of the straightening vane abuts on the upper surface 81f (see FIG. 7) of the fender body 81 of the backward fender 32.

A pair of right and left relief parts 81e for avoiding interference with the right and left fork pipes 27 (see FIG. 1) of the front fork 12 is formed on each of right and left sides of the fender body 81.

As shown in FIG. 2, a plurality of bolt insertion holes 82a, 83a for inserting the bolt 34 (see FIG. 1) are formed in side surfaces of the fastening arms 82, 83, and the fastening arms 82, 83 are attached to the lower part of the front fork 12 by the bolt 34. Also, rear walls 82b, 83b projecting inward in the vehicle width direction are integrally formed at rear edges of the fastening arms 82, 83.

Figure 4:
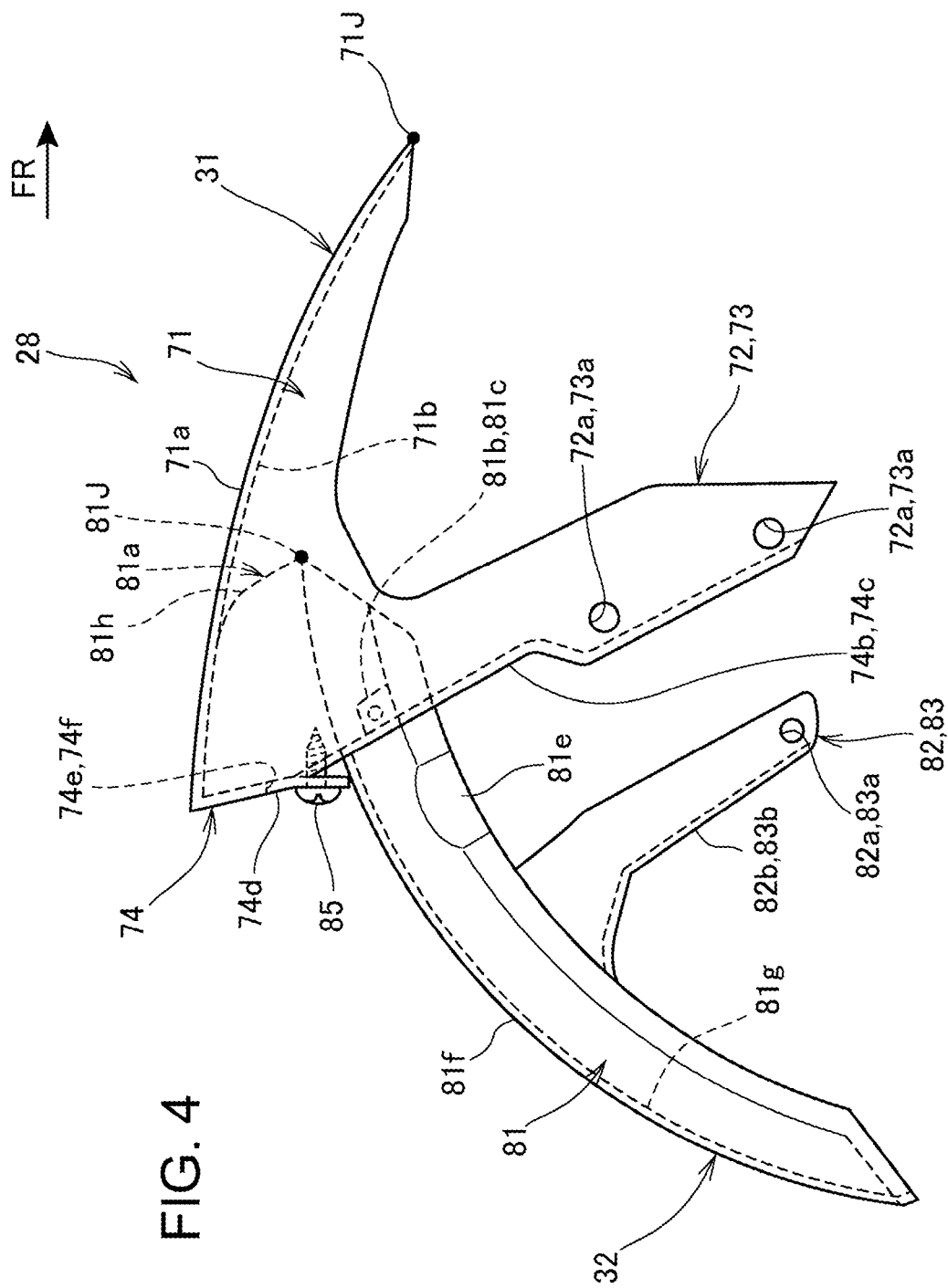
FIG. 4 is a right side view showing the front fender.

FIG. 4 is a right side view showing the front fender 28. Note that in the drawing, both reference signs are indicated if right and left reference signs show a different structure.

In the front fender 28, the backward fender 32 is attached to the rear part of the forward fender 31, and a front part of the backward fender 32 is entered into the inside of the rear part of the forward fender 31.

As a result, the front fender 28 is configured such that the front wheel 13 (see FIG. 1) is covered from above with the fender body 71 of the forward fender 31, and the front wheel 13 is covered obliquely upward from behind with the fender body 81 of the backward fender 32.

The forward fender 31 is formed into a substantially V shape in a lateral direction in a side view, and the fender body 71 has an upper surface 71a and a lower surface 71b that extend in an arcuate shape in the longitudinal direction.

The rear wall 74 of the forward fender 31 is a portion with the rear end of the fender body 71 formed to be bent downward, and the lower extension piece 74d formed with respect to the rear wall 74 and the straightening vane 81a are fastened by a screw 85.

The backward fender 32 is formed in a substantially T shape in the side view, and the upper surface 81f and the lower surface 81g of the fender body 81 extend in the arcuate shape in the longitudinal direction.

The ridge line 81h of the straightening vane 81a extends from a side of the rear wall 74 toward a side of a front end 81J of the fender body 81 while being allowed to abut on the lower surface 71b of the fender body 71 of the forward fender 31, and is separated from the lower surface 71b at the front end 81J and in the vicinity thereof.

Rear edges of the upwardly projecting pieces 81b, 81c of the backward fender 32 are brought into contact with or arranged close to the rear wall side parts 74b, 74c of the rear wall 74, and are fastened to the forward fender 31 by the screw from the inside. A tip end of the screw does not penetrate through a surface on an upper side of the forward fender 31 in consideration of appearance quality.

Figure 5:
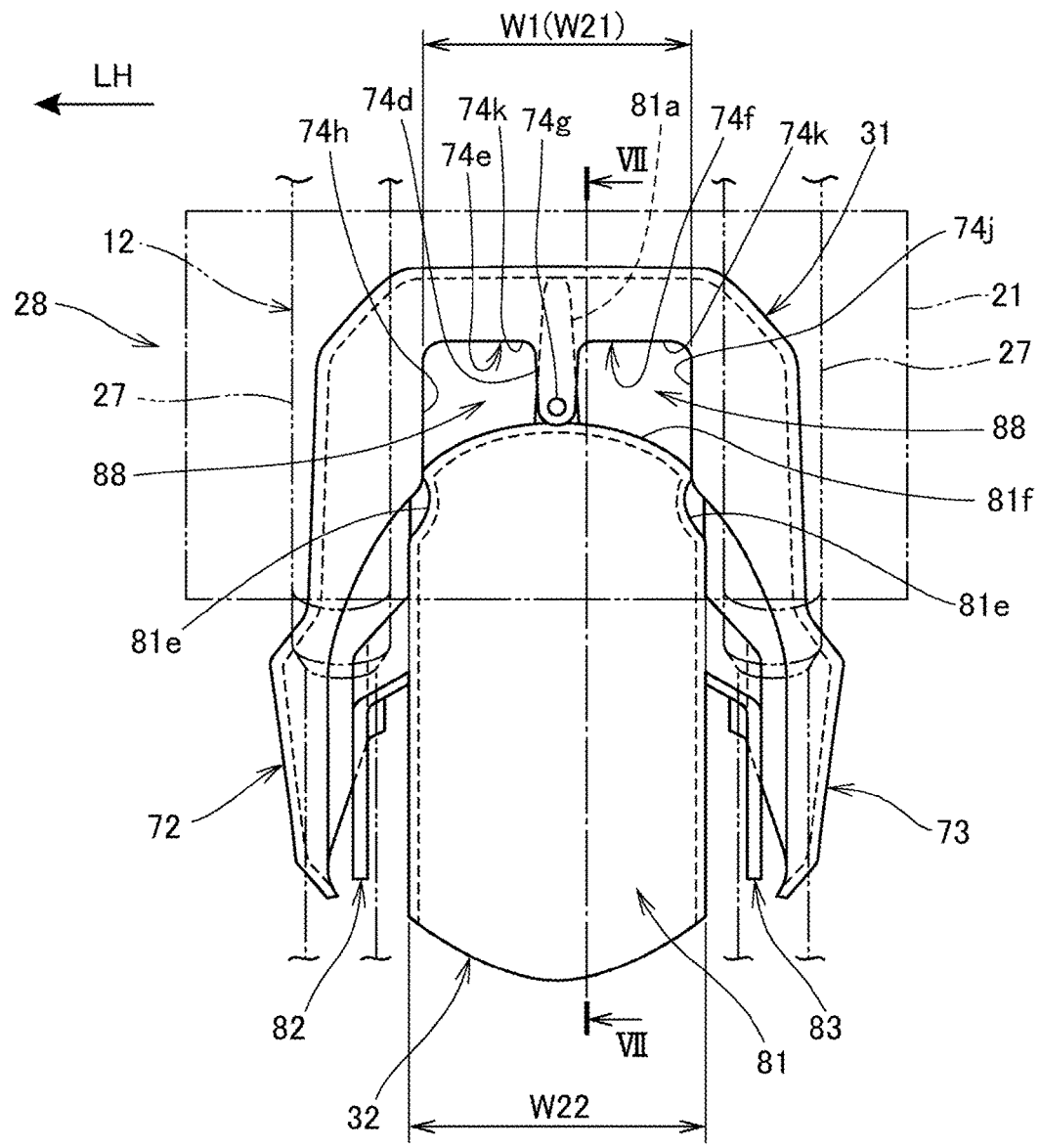
FIG. 5 is a rear view of the front fender.

FIG. 5 is a rear view of the front fender 28.

A reference sign W1 is indicative of a distance in the vehicle width direction between a left edge 74h of the left notch 74e and a right edge 74j of the right notch 74f of the forward fender 31, a reference sign W21 is indicative of a width of a front part (a portion in front of the relief part 81e) of the fender body 81 of the backward fender 32, and a reference sign W22 is indicative of a width of a rear part (a portion behind the relief part 81e) of the fender body 81. The width W21 is slightly narrower than the distance W1, and the front part of the fender body 81 is fitted into the inner sides of the right and left notches 74f, 74e. Also, the width W22 is larger than the width W21.

The right and left notches 74f, 74e of the forward fender 31 and the upper surface 81f of the fender body 81 of the backward fender 32 form ventilating holes 88. The ventilating holes 88 overlap with a radiator 22 in the front view.

Right and left fastening arms 73, 72 of the forward fender 31 are formed to be comparatively large in width in a horizontal direction in order to cover almost the fastening arms 83, 82 of the backward fender 32 from the front. In this way, since the right and left fastening arms 73, 72 of the forward fender 31 are formed to be comparatively large in width while suppressing overhang to the outside in the vehicle width direction, the front sides of the right and left fork pipes 27 of the front fork 12 can be covered with the fastening arms 72, 73. With this arrangement, the traveling air in front of the fork pipes 27 can be straightened by the fastening arms 72, 73, and the traveling air lateral to the fork pipes 27 can be smoothly led to flow. Also, the lower part of the front fork 12 can be protected from stones or the like flying from the front side by the fastening arms 72, 73.

Figure 6:
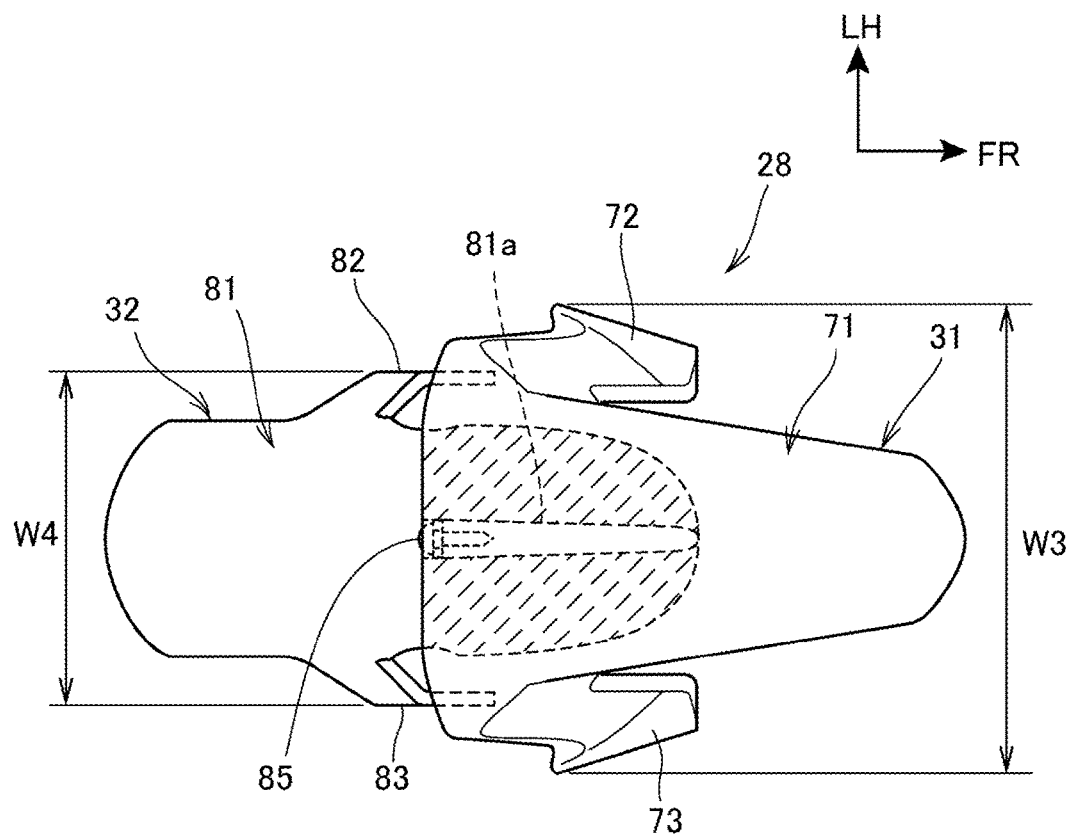
FIG. 6 is a plan view showing the front fender.

FIG. 6 is a plan view showing the front fender 28.

The straightening vane 81a of the backward fender 32 is formed in the center of the fender body 81 in the vehicle width direction so as to extend in the longitudinal direction. In this way, since the straightening vane 81a is provided, the traveling air flowing through a portion with the fender bodies 71, 81 overlapping with each other (a portion with dashed hatching in the drawing) can be straightened, and the traveling air can be smoothly led to flow.

A reference sign W3 is indicative of an outer dimension in the vehicle width direction of the right and left fastening arms 73, 72 of the forward fender 31, and a reference sign W4 is indicative of an outer dimension in the vehicle width direction of the right and left fastening arms 83, 82 of the backward fender 32. In the embodiment, since the front fender 28 is divided into the forward fender 31 and the backward fender 32 that are formed separately from each other. For this reason, for example, in comparison with the case that the forward fender and the backward fender are integrally formed in a mold, a difference between the outer dimensions W3 and W4 can be increased.

In the case that the front fender 28 is integrally formed as described above and the front fastening arm and the rear fastening arm are formed, such die forming that the difference in the outer dimensions on the right side and the left side between the front fastening arm and the rear fastening arm is increased is difficult because there is restriction on a die. In the embodiment, since the difference between the outer dimension W3 and the outer dimension W4 can be increased, almost the front part of the lower part of the front fork 12 (see FIG. 1) can be covered with the right and left fastening arms 73, 72 of the forward fender 31.

Figure 7:
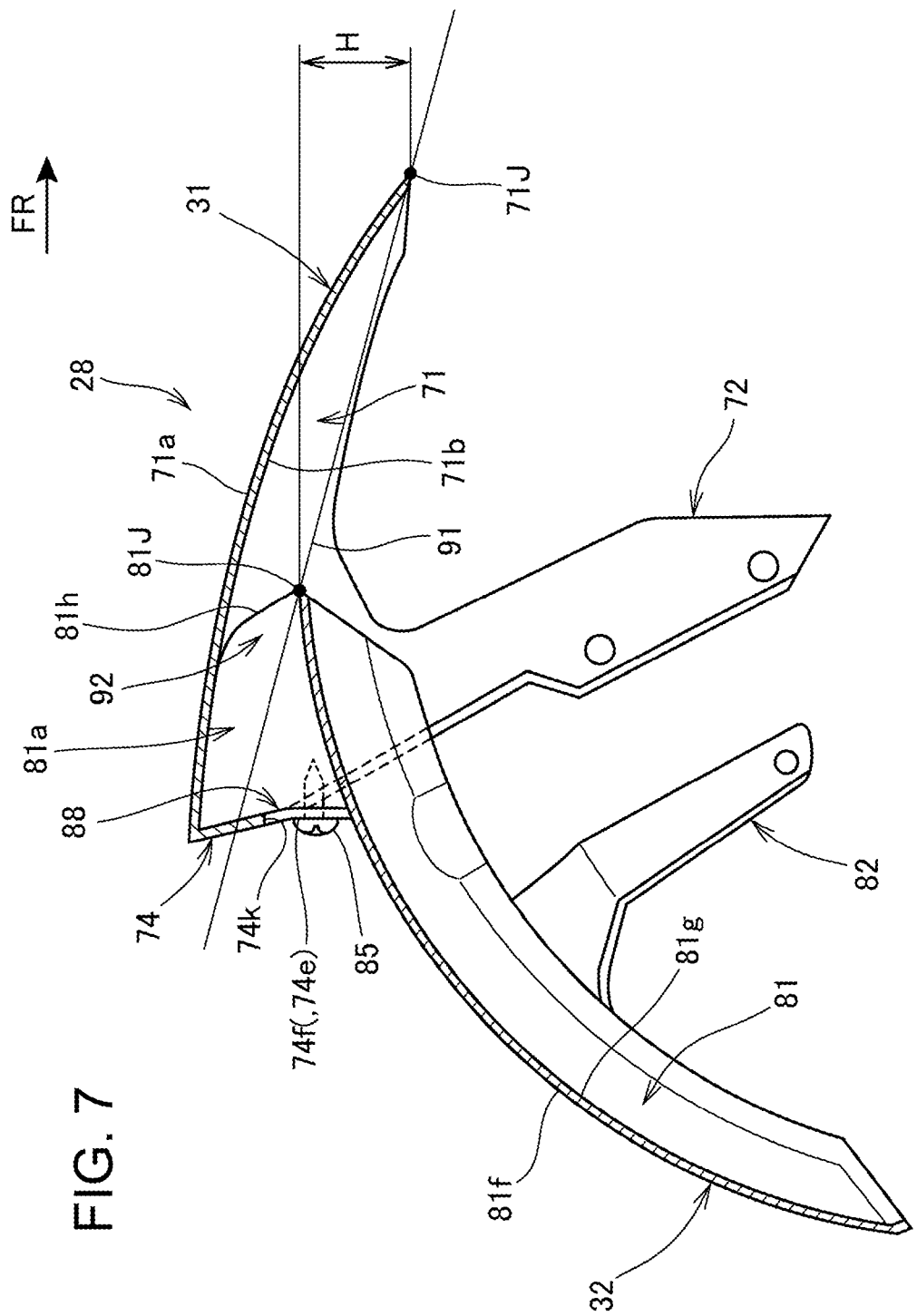
FIG. 7 is a cross-sectional view taken along line VII-VII in FIG. 5; and, FIG. 8 is an action diagram showing action of the front fender.

FIG. 7 is a cross-sectional view taken along line VII-VII in FIG. 5.

The front end 81J of the fender body 81 of the backward fender 32 is positioned above the front end 71J of the fender body 71 of the forward fender 31 by a reference sign H in a height direction.

Also, upper edges 74k of the notches 74f, 74e of the forward fender 31 are provided below a straight line 91 passing through the front end 71J of the forward fender 31 and the front end 81J of the backward fender 32.

In this way, since the front end 81J of the backward fender 32 is arranged above the front end 71J of the forward fender 31 and the upper edges 74k of the notches 74e, 74f are provided below the straight line 91 passing through the front ends 71J, 81J, a vertically bent air passage 92 can be formed between the forward fender 31 and the backward fender 32.

The air passage 92 is a passage passing through the ventilating holes 88 from below the front end 71J of the fender body 71 of the forward fender 31 via an upper part of the front end 81J of the fender body 81 of the backward fender 32. A portion from below the front end 71J of the fender body 71 to the upper part of the front end 81J of the fender body 81 is made to serve as a passage formed upward to the rear.

Also, in comparison with the existing front fender with the upper surface having the arcuate shape in the longitudinal direction in the side view gradually lowered after being temporarily heightened from the front end toward the rear side, the upper surface 71a of the forward fender 31 is formed in such a manner as to be gradually heightened from the front end 71J toward the rear side and to be made to substantially level in the vicinity of the rear end.

Next, action of the above-mentioned front fender 28 will be described.

Figure 8:
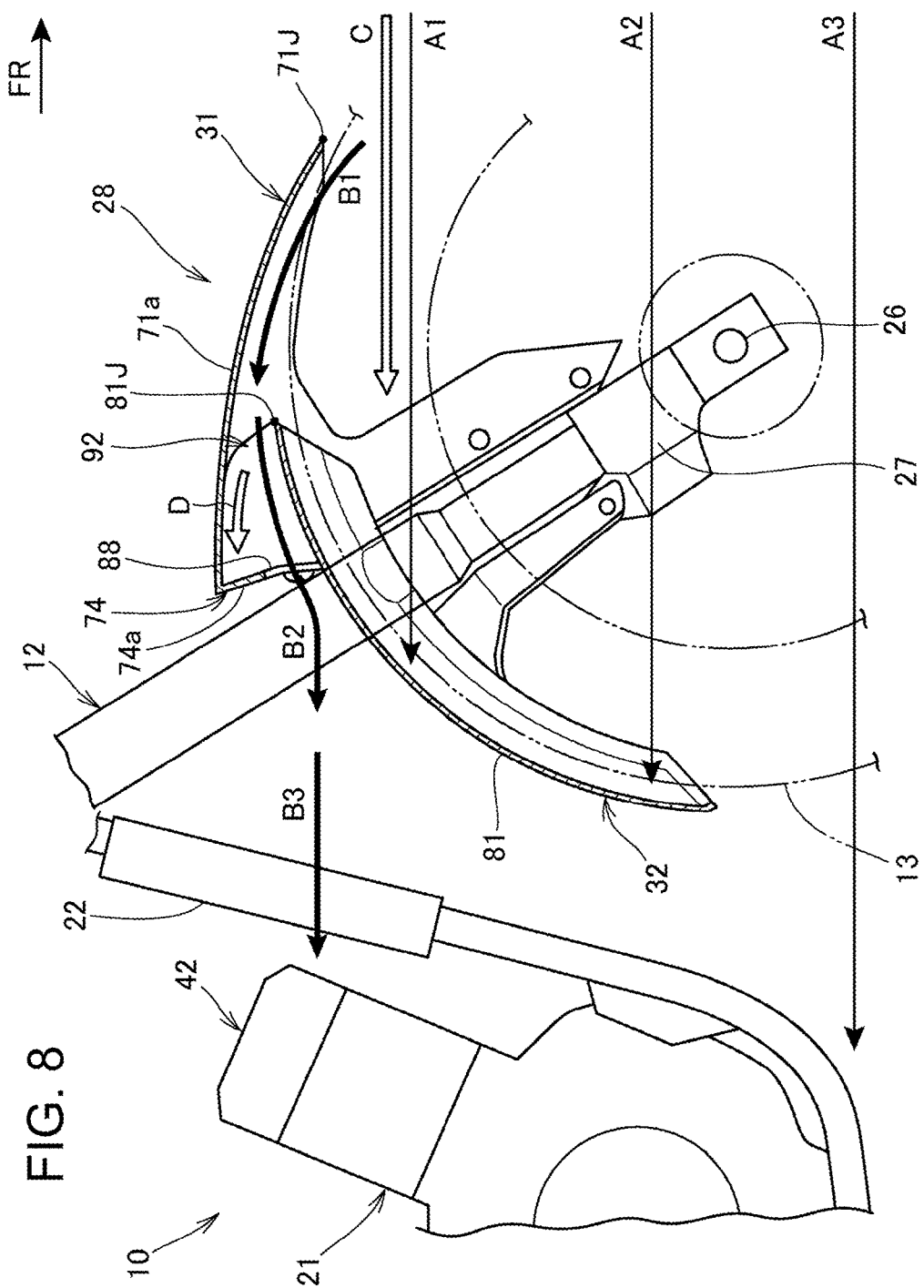

FIG. 8 is an action diagram showing the action of the front fender 28.

During traveling of the motorcycle 10, the traveling air is led to flow from the front side of the vehicle toward the motorcycle 10 as shown by arrows A1, A2, A3.

In the front fender 28 according to the embodiment, the air passage 92 leading from the front side of the front fender 28 to the rear side thereof is formed as the vertically bent passage. For this reason, as shown by arrows B1, B2, B3, the traveling air is brought from the front side of the front fender 28 to the radiator 22 and the engine 21 through the air passage 92, and cools the engine and the radiator.

As shown by an outline arrow C, even if the water, mud or the like splashed by the vehicle traveling in front of one's own vehicle or the front wheel 13 of one's own vehicle is scattered toward one's own vehicle or makes a U-turn to the rear side after being splashed forward from the side of the front wheel 13, the water, mud or the like moved rearward below the front end 71J of the forward fender 31 is blocked by the backward fender 32. For this reason, movement of the water, mud or the like to the side of the engine 21 and the radiator 22 is suppressed.

For example, as shown by an outline arrow D, even when the water, mud or the like is scattered between the fender body 71 of the forward fender 31 and the fender body 81 of the backward fender 32, the water, mud or the like is caught by being hit against the rear wall upper part 74a of the rear wall 74, and is prevented from being brought from the ventilating holes 88 to the radiator 22 and the engine 21.

In this way, since the air passage 92 is provided in the front fender 28, the water, mud or like can be prevented from being scattered to the engine 21, the radiator 22, or the like while cooling the engine 21 and the radiator 22 by sending the traveling air to the engine 21 and the radiator 22. Also, since the traveling air is smoothly passed through the inside of the front fender 28, air resistance against the front fender 28 can be reduced.

Further, since the upper surface 71*a* of the forward fender 31 is gradually heightened backward from the front end 71J and is made to substantially level in the vicinity of the rear end, the traveling air led to flow backward around the upper surface 71*a* of the forward fender 31 can be straightened, turbulence generation on the rear side of the forward fender 31 can be suppressed in comparison with the existing front fender, and the traveling air can be smoothly led to flow to the sides of the radiator 22 and the engine 21. Since the traveling air straightened by the forward fender 31 is hit against also the front lower cowl 56 (see FIG. 1) arranged behind the forward fender 31, the traveling air can be smoothly straightened also by the front lower cowl 56, and the air resistance against the vehicle body can be further reduced.

As has been shown above in FIG. 1, FIG. 2 and FIG. 7, in the front fender structure for the motorcycle 10 as the saddle-ride type vehicle in which the front fork 12 is steerably supported at the front end of the vehicle body frame 11, the front wheel 13 is supported at the lower end of the front fork 12, the front wheel 13 is covered with the front fender 28 from above, the engine 21 is arranged behind the front fender 28, and the front fender 28 is composed of the forward fender 31 and the backward fender 32 having the portion overlapping with the forward fender 31 in the plan view, the front fender 28 is supported by the front fork 12 so that the front end 81J of the backward fender 32 is positioned higher than the front end 71J of the forward fender 31 in the side view, and the ventilating holes 88 for allowing the traveling air to flow are provided behind the forward fender 31 and above the backward fender 32.

With this structure, the traveling air passing between the forward fender 31 and the backward fender 32 can be led to flow to the engine 21 through the ventilating holes 88, and the engine 21 and the periphery thereof (the radiator 22, an oil cooler, or the like) can be effectively cooled. Also, since the traveling air is passed through the inside of the front fender 28, the air resistance against the front fender 28 can be reduced.

Further, in the side view, the front end 81J of the backward fender 32 is positioned higher than the front end 71J of the forward fender 31. For this reason, when the water, mud or the like splashed from the road surface is scattered from the front side of the front fender 28 to the rear side thereof, scatter of the water, mud or the like to the ventilating holes 88 is suppressed, so that the water, mud or the like can be prevented from reaching the engine 21.

In this way, the engine 21 and the periphery thereof can be effectively cooled while suppressing scatter of the splashed water, mud or the like to the engine 21.

Also, the ventilating holes 88 are formed of the rear wall 74 (detailedly, the notches 74*e*, 74*f* formed in the rear wall 74) provided at the rear edge of the forward fender 31 so as to extend downward, and the upper surface 81*f* of the fender body 81 of the backward fender 32, and the front end 71J of the backward fender 32 is arranged forward of the rear wall 74. In this way, the rear edge of the forward fender 31 is integrally provided with the rear wall 74. For this reason, the rigidity of the forward fender 31 can be improved, and the deformation of the forward fender 31 can be suppressed even if the ventilating holes 88 are formed in the rear wall 74. Also, the water, mud or the like scattered from the front can be caught by the rear wall 74, and scatter of the water, mud or the like to the side of the engine 21 can be further suppressed. Further, since the rear wall 74 is provided, the inside of the forward fender 31 can be made less visible from the obliquely rear side of the vehicle, and the appearance quality can be improved.

Also, the rear wall 74 of the forward fender 31 is provided with the lower extension piece 74*d* as the fastening part to which the backward fender 32 is fastened. Since the lower extension piece 74*d* for fastening the backward fender 32 is provided to the rear wall 74 of the forward fender 31, the backward fender 32 can be firmly fastened to the forward fender 31. For this reason, the vibration and the mutual displacement of the forward fender 31 and the backward fender 32 can be prevented.

Also, the forward fender 31 and the backward fender 32 are respectively provided with a pair of left and right fastening arms 72, 73, 82, 83 fastened to the lower part of the front fork 12, the fastening arms 72, 73 of the forward fender 31 are fastened to the front side of the lower part of the front fork 12, and the fastening arms 82, 83 of the backward fender 32 are fastened to the rear side of the lower part of the front fork 12. With this arrangement, the respective fastening arms 72, 73, 82, 83 of the forward fender 31 and the backward fender 32 are distributedly fastened to the front side and the rear side of the lower part of the front fork 12. For this reason, overhang of the fastening arms 72, 73, 82, 83 to the outside in the vehicle width direction can be suppressed.

Since the straightening vane 81*a* extending in the longitudinal direction of the vehicle is provided between the forward fender 31 and the backward fender 32, the traveling air can be straightened by the straightening vane 81*a* and can be efficiently led to flow to the rear. Also, since the straightening vane 81*a* is provided, the rigidity can be improved, and the vibration can be prevented.

Also, the straightening vane 81*a* extends from either the forward fender 31 or the backward fender 32, and abuts on the other. For this reason, the mutual vibration can be prevented by allowing the straightening vane 81*a* provided to either the forward fender 31 or the backward fender 32 to abut on the other.

Also, as shown in FIGS. 1-3, the backward fender 32 is provided with the relief parts 81*e* for avoiding interference with the front fork 12 on either side surface of the backward fender 32. For this reason, the horizontal width of the front fork 12 is narrowed and the traveling air can be efficiently introduced from the ventilating holes 88 to the engine 21.

Also, as shown in FIG. 1, the upper end of the front fork 12 is covered with the front lower cowl 56 as the front cowl, and the front lower cowl 56 is formed with the relieve part 56*a* as the groove part for avoiding interference with the forward fender 31 when the front fork 12 is most contracted. For this reason, the cross-sectional surface of the traveling air passage (air passage 92) between the forward fender 31 and the backward fender 32 can be enlarged by upwardly swelling the upper part of the forward fender 31, and the cooling effect with respect to the engine 21 can be further improved by increasing the air volume of the traveling air.

Also, as shown in FIG. 1 and FIG. 5, the radiator 22 is arranged behind the front fender 28 and the front fork 12, and the radiator 22 overlaps with the front fender 28 when viewed from the front side. For this reason, the radiator 22 can be efficiently cooled by exposing the radiator 22 to the traveling air from the ventilating holes 88 while suppressing the water, mud or the like splashed from the front side of the radiator 22.

The above-described embodiment absolutely shows one mode of the present invention, and an alternative and application can be optionally made within the scope not departing from the gist of the present invention.

For example, in the above-mentioned embodiment, as shown in FIG. 5, although the ventilating holes 88 are formed of the notches 74e, 74f formed in the rear wall 74 of the forward fender 31 and the upper surface 81f of the backward fender 32, this is not limited thereto. Instead of the notches 74e, 74f, the ventilating holes may be opened in the rear wall 74 of the forward fender 31.

The present invention is not limited to the case applied to the motorcycle 10, and can be applied also to the saddle-ride type vehicles including vehicles excluding the motorcycles. Note that the saddle-ride type vehicles include all vehicles with a rider rides on the vehicle body in a striding manner, and are vehicles including not only the motorcycles (including motorized bicycles) but also three-wheeled vehicles and four-wheeled vehicles classified into ATVs (All Terrain Vehicles).

REFERENCE SIGN LIST

10 . . . Motorcycle (saddle-ride type vehicle)
11 . . . Vehicle body frame
12 . . . Front fork
13 . . . Front wheel
21 . . . Engine
22 . . . Radiator
28 . . . Front fender
31 . . . Forward fender
32 . . . Backward fender
56 . . . Front lower cowl (front cowl)
56a . . . Relief part (groove part)
71J . . . Front end of forward fender
72, 73, 82, 83 . . . Fastening arm
74 . . . Rear wall
74d . . . Lower extension piece (fastening part)
74g, 81k . . . Screw insertion hole
81a . . . Straightening vane
81e . . . Relief part (front fork relief part)
81J . . . Front end of backward fender
88 . . . Ventilating hole

What is claimed is:

1. A front fender structure for a saddle-ride type vehicle in which a front fork is steerably supported at a front end of a vehicle body frame, a front wheel is supported at a lower end of the front fork, the front wheel is covered with a front fender from above, an engine is arranged behind the front fender, and the front fender is composed of a forward fender and a separate backward fender mounted to the forward fender and having a portion overlapping with the forward fender in a plan view,
wherein the front fender is supported by the front fork in such a manner that a front end of the backward fender is positioned higher than a front end of the forward fender in a side view, and is formed with a ventilating hole allowing traveling air to pass through and provided behind the forward fender and above the backward fender, wherein the ventilating hole is defined by both a portion of the forward fender and a portion of the backward fender.

2. The front fender structure for a saddle-ride type vehicle according to claim 1, wherein the ventilating hole is formed of a rear wall provided at a rear edge of the forward fender in order to extend downward and an upper surface of the backward fender, and the front end of the backward fender is arranged forward of the rear wall.

3. The front fender structure for a saddle-ride type vehicle according to claim 2, wherein the rear wall of the forward fender is provided with a fastening part to which the backward fender is fastened.

4. The front fender structure for a saddle-ride type vehicle according to claim 3, wherein a straightening vane extending in a vehicle longitudinal direction is provided between the forward fender and the backward fender.

5. The front fender structure for a saddle-ride type vehicle according to claim 4, wherein the straightening vane extends from either the forward fender or the backward fender and abuts on the other.

6. The front fender structure for a saddle-ride type vehicle according to claim 5, wherein the forward fender and the backward fender are respectively provided with a pair of left and right fastening arms fastened to a lower part of the front fork, the fastening arms of the forward fender are fastened to a front side of a lower part of the front fork, and the fastening arms of the backward fender are fastened to a rear side of the lower part of the front fork.

7. The front fender structure for a saddle-ride type vehicle according to claim 6, wherein the backward fender is provided with front fork relief parts for avoiding interference with the front fork on either side surface of the backward fender.

8. The front fender structure for a saddle-ride type vehicle according to claim 1, wherein an upper end of the front fork is covered with a front cowl, and the front cowl is formed with a groove part for avoiding interference with the forward fender when the front fork is most contracted.

9. The front fender structure for a saddle-ride type vehicle according to claim 2, wherein an upper end of the front fork is covered with a front cowl, and the front cowl is formed with a groove part for avoiding interference with the forward fender when the front fork is most contracted.

10. The front fender structure for a saddle-ride type vehicle according to claim 3, wherein an upper end of the front fork is covered with a front cowl, and the front cowl is formed with a groove part for avoiding interference with the forward fender when the front fork is most contracted.

11. The front fender structure for a saddle-ride type vehicle according to claim 4, wherein an upper end of the front fork is covered with a front cowl, and the front cowl is formed with a groove part for avoiding interference with the forward fender when the front fork is most contracted.

12. The front fender structure for a saddle-ride type vehicle according to claim 5, wherein an upper end of the front fork is covered with a front cowl, and the front cowl is formed with a groove part for avoiding interference with the forward fender when the front fork is most contracted.

13. The front fender structure for a saddle-ride type vehicle according to claim 6, wherein an upper end of the front fork is covered with a front cowl, and the front cowl is formed with a groove part for avoiding interference with the forward fender when the front fork is most contracted.

14. The front fender structure for a saddle-ride type vehicle according to claim 7, wherein an upper end of the front fork is covered with a front cowl, and the front cowl is formed with a groove part for avoiding interference with the forward fender when the front fork is most contracted.

15. The front fender structure for a saddle-ride type vehicle according to claim 1, wherein a radiator is arranged behind the front fender and the front fork, and the radiator overlaps with the front fender when viewed from a front side.

16. The front fender structure for a saddle-ride type vehicle according to claim 2, wherein a radiator is arranged behind the front fender and the front fork, and the radiator overlaps with the front fender when viewed from a front side.

17. The front fender structure for a saddle-ride type vehicle according to claim 3, wherein a radiator is arranged behind the front fender and the front fork, and the radiator overlaps with the front fender when viewed from a front side.

18. The front fender structure for a saddle-ride type vehicle according to claim 4, wherein a radiator is arranged behind the front fender and the front fork, and the radiator overlaps with the front fender when viewed from a front side.

19. The front fender structure for a saddle-ride type vehicle according to claim 5, wherein a radiator is arranged behind the front fender and the front fork, and the radiator overlaps with the front fender when viewed from a front side.

20. The front fender structure for a saddle-ride type vehicle according to claim 6, wherein a radiator is arranged behind the front fender and the front fork, and the radiator overlaps with the front fender when viewed from a front side.

* * * * *